United States Patent Office 2,871,123
Patented Jan. 27, 1959

2,871,123
CALCIUM ENRICHED MILK

Clifford D. Bauer, Robert M. Marks, and Edwin A. Bernardoni, Elgin, Ill., assignors to The Borden Company, a corporation of New Jersey No Drawing. Application June 10, 1955
Serial No. 514,778

2 Claims. (Cl. 99—54)

This invention relates to a milk product of increased calcium content and to the process of making it.

There has been recognized for some time the desirability of increased ratio of calcium to phosphorus in milk for infants. When, however, calcium in soluble form is added in proportion to exceed a critical level, there is destabilization to such extent that coagulation of the milk proteins may occur on heating. When, on the other hand, the attempt has been made to introduce the calcium in insoluble form, the added calcium compound has been subject to settling out, even in the presence of agents that increase the viscosity.

The present invention provides a composition and process which make possible the inclusion of insoluble calcium compounds in milk without appreciable settling on standing, even at relatively low viscosity, and without curdling and separation of protein during heating.

Briefly stated, the invention comprises interacting Irish moss with milk proteins dissolved in water and intimately admixed with a finely divided insoluble calcium compound, at a temperature at least as high as about 145° F. but below the temperature of curdling of the milk, and then cooling the product.

The result is a liquid milk product of viscosity not above that suitable for infant feeding (after suitable dilution in case the product is one that has been concentrated at the time of processing) and in which the insoluble calcium compound is substantially completely non-settling even on long storage.

As an explanation of the non-settling properties of our product, we consider that the Irish moss, which contains sulfuric acid ester groups, reacts with proteins of the milk to form in effect a network in which the particles of insoluble calcium compound present at the time are so enmeshed that their settling is subsequently prevented. Whether this action is principally chemical reaction between the Irish moss and milk proteins, attraction between ions of dissimilar charges, or change in the nature and degree of association of water with the milk proteins is not at this time entirely clear. The action that occurs is accompanied by a moderate increase in viscosity of the mixture such as 10%–40% increase to a maximum in 18 minutes at a maximum temperature of 247° F. and in a somewhat longer time at temperatures of 145° and up, the viscosity being measured at room temperature. Since the viscosity becomes practically constant, we are able to judge the substantial completeness of the action between the milk proteins and the Irish moss by noting when the rate of increase of the viscosity becomes very slow.

As to materials, there is no substitute known for the combination of milk proteins, the Irish moss and insoluble calcium compound, which substitute, if used, would give the desired result of non-settling of the insoluble calcium compound at our viscosities of finished product.

The milk product to be calcium enriched may be any convenient source of milk proteins in water solution. Thus the milk product may be condensed skim milk, whole or skim milk powder, fresh whole or skimmed milk, evaporated milk, or sweetened condensed milk.

The Irish moss may be any commercial food grade of Irish moss, that is, the purified extract of carrageenin. Such grades that have been used to advantage are those known as "Sea-Kem."

The insoluble calcium compound to be used must be so fine that at least half of it by weight is finer than 5 microns. The precipitated calcium carbonate is particularly satisfactory. It meets the requirements in being inexpensive, high in calcium content, substantially insoluble, and readily available. A representative precipitated material that has been used to advantage is of particle size substantially completely between 0.5 and 3.0 microns.

An edible fat may be and ordinarily is admixed. Examples are butter fat, the fractions of coconut oil and beef fat that have initial crystallizing points below 20° C., and refined olive or soya oil.

When a fat is admixed, a non-toxic emulsifying agent for the fat is present and the fat is in emulsified condition. Examples of suitable emulsifying agents are lecithin, the emulsifying agents naturally occurring in milk and concentrated forms thereof, and partial esters of polyhydric alcohols with higher fatty acids such as, for example, as sorbitol monooleate.

As to proportions, the selected insoluble calcium compound is introduced in amount to give the calcium content desired in the finished product. In making infant food, for instance, the compound is used to advantage in amount to provide about 1.5–2.0 parts by weight of calcium (Ca) to 1 of phosphorus (P) in the final composition.

The Irish moss is used in proportion to give the necessary action without increasing the viscosity to an objectionable extent and without use of such excessive amounts of Irish moss as to cause gelling or the precipitation of protein. Suitable proportions of the Irish moss extract are within the range 0.02%–0.10% on the total weight of the milk product being treated. When a less highly purified Irish moss is used, there is required proportionately higher levels of it, up to double the range stated, to produce the desired effect. Seasonal and other variations in the milk being processed also affect the proportion of the Irish moss required. Consequently the proportion required at a given time may not be the exact proportion that gives best results with another milk.

As to mixing, the ingredients including the liquid milk product, Irish moss, and insoluble calcium compound to be suspended are thoroughly mixed together before the heating step for causing the action of the Irish moss with the milk proteins and the necessary association of the calcium compound with the product. The pH of the mixture is established in the range 6–7 by the addition of non-toxic acid or alkali in amount required, if any, to make the necessary adjustment. If acid is required it may be dilute sulfuric, hydrochloric, or phosphoric, for instance. If alkali is required, it may be an aqueous solution of an alkali such as sodium or potassium hydroxide, carbonate or bicarbonate.

The heating step to react the Irish moss extract with the milk product is effected at temperatures of 145° F. as the lower limit and below the higher temperature of curdling of the milk. The exact condition of heating varies somewhat with the kind of milk product or the particular lot thereof being processed. In general, higher temperatures within the range stated are used with short times of heating and lower temperatures for longer times of heating. For most milks, heating at 145° F. for 30 min. or at 300° F. for a few seconds are satisfactory.

The invention will be further illustrated by description in connection with the following specific examples of the practice of it, proportions here and elsewhere herein being expressed as parts by weight.

*Example 1*

An infant food was made of the following composition:

| | |
|---|---|
| Skim milk solids | 14 |
| Corn syrup solids | 4.5 |
| Cocoanut oil | 3 |
| Beef fat (destearinated) | 3.5 |
| Lecithin | 0.40 |
| Calcium carbonate (pptd.) | 0.15 |
| Irish moss (Sea-Kem No. 2) | 0.045 |
| Water to make 100 parts | |

Most of the water was first placed in a jacketed mixing kettle and heated to 140° F. The skim milk solids were added to the warm water, with agitation. The previously mixed oil, fat and lecithin, warmed to 140° F., were next added and mixed into the reconstituted milk solids in water. The calcium carbonate, previously slurried in the remainder of the water, was added. Finally the corn syrup solids of dextrose equivalent approximately 24% were mixed with the Irish moss extract and then admixed into the whole composition. After thorough mixing, the entire formulation was homogenized at 140° F. and then cooled.

The product was filled into cans, sealed, and placed in a steam heated vessel. A period of 12 minutes was allowed to raise the temperature of the vessel to 247° F. The temperature was then maintained at 247° F. for a period of 18 minutes. This was followed by cooling.

Experience has shown such heating to be adequate to bring about the desired action of the Irish moss with the milk proteins and association with the insoluble calcium compound, that is, to the stage where further action including viscosity rise is not rapid.

After cooling it was found that the viscosity of the mix had been increased by the heating to 41 cps. from 29 cps. for the same mixture unheated. (Since this percentage increase varies somewhat from batch to batch of the milk product used, figures given are illustrative only.)

Other conventional additives, as for example, minor proportions of vitamins, methionine, and iron salts, may be and ordinarily are added, for their usual effects, to the mix before canning.

The product is a non-settling, calcium enriched, concentrated milk product suitable for dilution with an equal volume of water and then for use as an infant food.

*Example 2*

In place of making a reconstituted milk, by dispersing the skim milk solids in water as above, there is used a condensed skim milk. In this case the Irish moss and the calcium carbonate are added in about the proportion to milk solids as in Example 1. Also stirring and heating are effected as in Example 1.

*Example 3*

The infant food composition described in U. S. Patent 2,659,676, issued to Howard and Muller on November 17, 1953, is used, with the exceptions that, in the "formula" thereof using skim milk condensed to 21%–26.5% solids as the source of milk proteins, the calcium chloride is replaced by precipitated calcium carbonate in the proportion of 0.6 part for 100 parts dry weight of the formula and there is also incorporated Irish moss in the proportion of 0.16 part for 100 parts of the dry weight. The mixture so made is reconstituted with three times its weight in water, the whole thoroughly mixed, canned and subjected to a temperature of at least 145° F. and, in commercial scale operation, to 247° F. for 18 minutes.

The heating as described causes not only the action between the Irish moss and milk proteins but also sterilization. For the latter effect, the temperatures and times of heating must be at least as severe as those accepted as standard for sterilization of milk products to be distributed as are the present products.

It will be understood that it is intended to cover all changes and modifications of the examples of the invention herein chosen for the purpose of illustration which do not constitute departures from the spirit and scope of the invention.

What is claimed is:

1. In suspending a water insoluble calcium compound in non-settling condition in an aqueous liquid milk product containing milk protein, the process which comprises forming an intimate mixture of the milk product, Irish moss extract constituting the sole admixed anti-settling agent and being in the proportion of about 0.02%–0.1% of the weight of the said milk product, finely divided calcium carbonate of such size of particles that at least half by weight is finer than 5 microns, adding a pH establishing material in any amount required to establish the pH of the mixture within the range 6–7, then heating the said mixture to an elevated temperature at least as high as 145° F. and below the temperature of heat curdling of the milk protein, to cause interaction of the milk protein and the Irish moss extract in contact with the calcium carbonate, maintaining the mixture at the said elevated temperature until the viscosity as measured at room temperature rises 10%–40% above the viscosity of the original mixture and until the said interaction is substantially complete as shown by no further substantial rise in the viscosity, and then cooling the material, the calcium carbonate being added in amount to make the Ca:P ratio in the product 1.5–2 parts of the calcium for 1 part of phosphorus.

2. An aqueous fluid milk product comprising an aqueous dispersion of milk protein, Irish moss extract constituting the sole admixed anti-settling agent and being in the proportion of about 0.02%–0.1% of the weight of the said milk product, finely divided calcium carbonate of such size of particles that at least half by weight is finer than 5 microns, and a pH establishing material in any amount required to establish the pH of the mixture within the range 6–7, the proportion of the carbonate establishing the ratio of Ca:P within the range 1.5–2 parts of calcium for 1 part of phosphorus, the said carbonate being non-settling as the product stands, and the whole product being non-curdling on heating to 247° F. for 18 minutes.

References Cited in the file of this patent

UNITED STATES PATENTS

| 612,561 | Dodd | Oct. 18, 1898 |
| 2,097,225 | Green et al. | Oct. 26, 1937 |
| 2,502,397 | Werbin | Mar. 28, 1950 |
| 2,541,568 | Bauer et al. | Feb. 13, 1951 |

OTHER REFERENCES

Gregory: Uses and Applications of Chemicals and Related Materials, vol. 11, New York, 1944, pp. 60–61.